United States Patent [19]

Burton

[11] 4,290,172

[45] Sep. 22, 1981

[54] KNOT RETAINER FOR SHOELACES

[76] Inventor: Gary B. Burton, 2617 SW. Water St., Portland, Oreg. 97201

[21] Appl. No.: 121,743

[22] Filed: Feb. 15, 1980

[51] Int. Cl.³ .......................... F16G 11/00; A43C 9/00
[52] U.S. Cl. ................................... 24/117; 24/129 R; 24/143 B
[58] Field of Search ................. 24/117 R, 118, 129 R, 24/140, 141, 142, 143 R, 143 A, 143 B, 121, 127

[56] References Cited

U.S. PATENT DOCUMENTS

| | | | |
|---|---|---|---|
| 509,707 | 11/1893 | Vachon | 24/117 R |
| 1,225,623 | 5/1917 | Hall et al. | 24/143 B |
| 1,531,410 | 3/1925 | Osterholt | 24/117 R |
| 1,806,162 | 5/1931 | Hahn | 24/117 R |
| 2,650,399 | 9/1953 | Torelli | 24/117 R |
| 2,911,698 | 11/1959 | Henderson | 24/117 R |
| 3,066,370 | 12/1962 | Epstein | 24/117 R |
| 3,296,669 | 1/1967 | Elder, Jr. | 24/129 R |
| 3,358,338 | 12/1967 | Clasen | 24/117 R |
| 3,500,508 | 3/1970 | Bennett | 24/117 R |
| 3,845,575 | 11/1974 | Boden | 24/117 R |
| 3,861,003 | 1/1975 | Boden | 24/117 R |
| 4,034,443 | 7/1977 | Turner | 24/129 R |
| 4,102,019 | 7/1978 | Boden | 24/117 R |

FOREIGN PATENT DOCUMENTS

| | | | |
|---|---|---|---|
| 192804 | 11/1957 | Austria | 24/117 R |
| 731056 | 2/1943 | Fed. Rep. of Germany | 24/118 |
| 2413885 | 10/1974 | Fed. Rep. of Germany | 24/117 R |

*Primary Examiner*—Victor N. Sakran
*Attorney, Agent, or Firm*—Eugene M. Eckelman

[57] ABSTRACT

A disc-like body member is arranged to lie flat on the lacing area of a shoe and has a first aperture arranged to receive both the free ends of a shoelace upwardly therethrough. A pair of second apertures also extend through the body member and are arranged to receive the free ends of the shoelace downwardly therethrough after a knot has been tied on the upper surface of the body member. Another pair of apertures may be provided in the body member which are arranged to receive the free ends of the shoelaces upwardly therethrough after the shoelaces have been passed down through the second apertures.

3 Claims, 3 Drawing Figures

KNOT RETAINER FOR SHOELACES

BACKGROUND OF THE INVENTION

This invention relates to new and useful improvements in a knot retainer for shoelaces.

It is customary to tie shoelaces in a bow knot to maintain the free ends of the shoelace in a tightened and out of the way position. Such bow knots even when properly tied frequently become untied especially on children's feet in view of the great activity associated therewith.

Devices have heretofore been employed in an attempt to maintain the knots in a tied condition. Such prior devices, however, are not believed to solve completely the problem at hand since they do not accomplish the desired combined features of being inexpensive to manufacture, simplified in use and effective for maintaining the knot in a tied condition.

SUMMARY OF THE INVENTION

According to the present invention and forming a primary objective thereof, a knot retainer for shoelaces is provided that overcomes the deficiencies of prior devices, namely, the invention is inexpensive to manufacture, simplified in use, and effective in maintaining a knot in tied condition.

The objectives of the invention are accomplished by a disc-like body member arranged to lie flat on the lacing area of a shoe and including first aperture means therethrough arranged to receive both the free ends of a shoelace to be tied upwardly therethrough. Second aperture means are provided through the body member which are arranged to receive the free ends of the shoelace downwardly therethrough after a knot has been tied on the upper surface of the body member. Additional aperture means may be provided through the body member which are arranged to receive the free ends of the shoelaces upwardly therethrough after they have been passed down through said second aperture means.

The invention will be better understood and additional objects and advantages will become apparent from the following description taken in connection with the accompanying drawings.

DETAILED DESCRIPTION OF A PREFERRED EMBODIMENT

Figure 1:
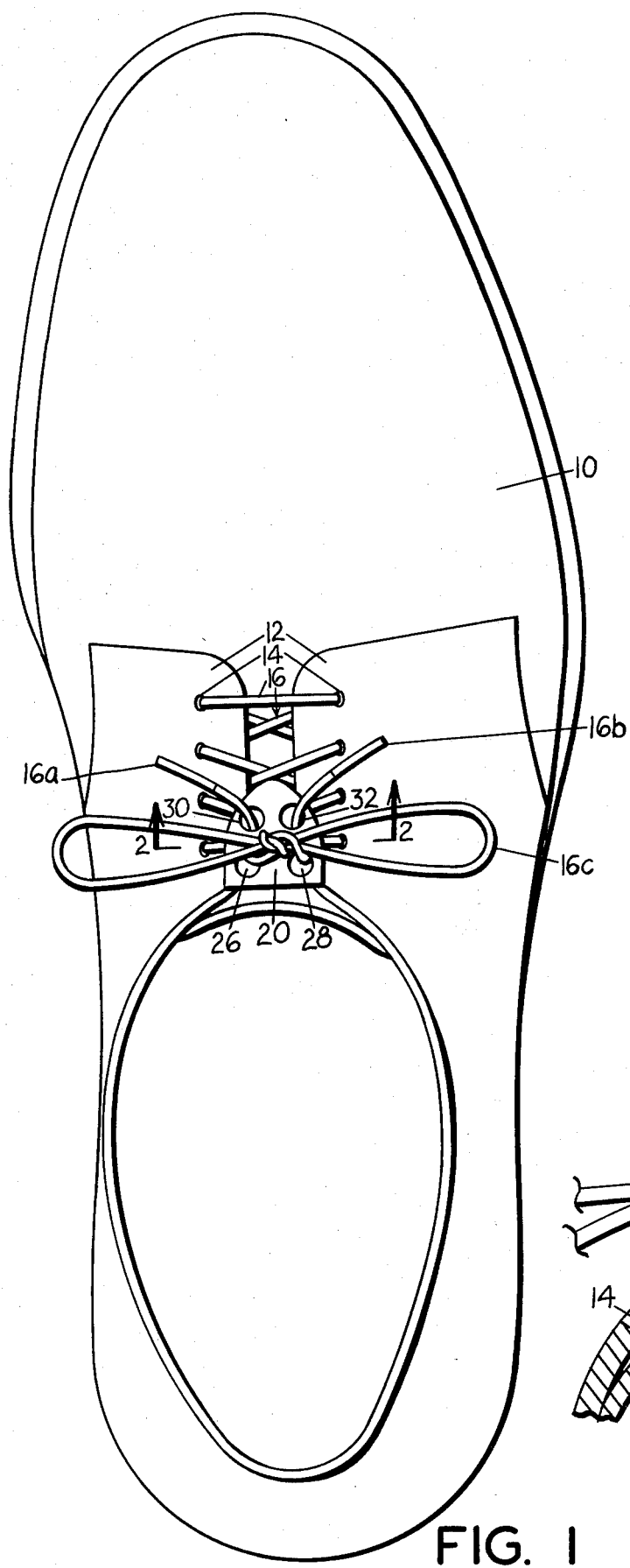
FIG. 1 is a plan view of the present knot retainer as applied to the lace portion of a shoe.
Figure 2:
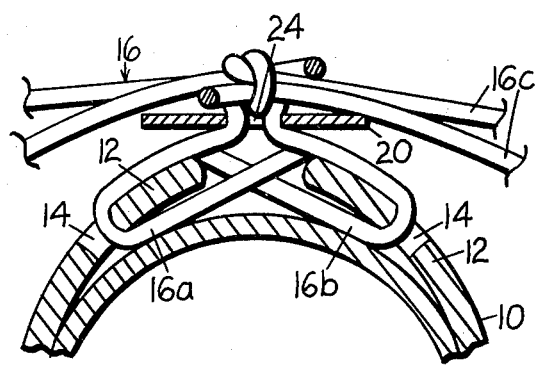
FIG. 2 is an enlarged sectional view taken on the line 2—2 of FIG. 1.

With reference first to FIGS. 1 and 2, a laced shoe 10 is illustrated having a lace portion 12 provided with eyelets 14 arranged to receive a shoelace designated generally by the numeral 16. For the purpose of illustrating the invention, the numerals 16a and 16b represent the free ends of the shoelace that are to be tied for securing the lace portion, and the numeral 16c represents the bow knot of the shoelace.

According to the present invention, means are associated with the free ends 16a and 16b and the bow knot 16c for maintaining the knot tied and also for maintaining the free ends 16a and 16b in an out of the way position.

Figure 3:
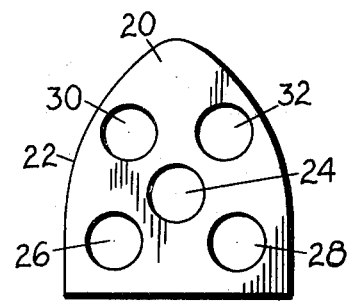
FIG. 3 is a plan view of the knot retainer shown apart from a shoe.

Such means comprises a body member 20, also seen in FIG. 3, in the form of a flat or substantially flat disc having defining edges 22 which may form any suitable shape.

The body member includes first aperture means 24 comprising a single aperture extending through the body portion. This aperture preferably, but not necessarily, is disposed in a central portion of the body member. Second aperture means are also provided, comprising a pair of apertures 26 and 28 disposed in spaced relation adjacent to but outwardly from the aperture 24. Third aperture means may also be provided and comprise a pair of apertures 30 and 32 also spaced near the central aperture 24 but outwardly relative thereto.

In the use of the present knot retainer, the ends 16a and 16b of the shoelace are both passed upwardly directly from the uppermost eyelets 14 in the lace portion 12 through the central aperture 24. The lace ends are used to tighten the lace portion 12 either before or after they are passed up through the aperture 24, and upon suitable tightening of such lace portion the usual bow knot 16c is formed therein. Thereupon, the free ends 16a and 16b are passed down through respective apertures 26 and 28. These free ends of the shoelace, being extended downwardly through the body member 20 will not allow the knot in the bow to become untied. Such positioning of these free ends also anchors them somewhat on the shoe so that they will not flop around during activity.

If it is desired to anchor additionally the free ends 16a and 16b to further preserve the knot 16c or also to further shorten these tag ends, such ends can be passed upwardly through respective apertures 30 and 32 as shown in FIG. 1.

The knot retainer, comprising simply a flat or substantially flat disc member with a plurality of apertures, is inexpensive to manufacture. In addition, it is extremely simplified in use since as stated it is merely necessary for the tag ends of the shoelace to be inserted upwardly through the central aperture 24 and tied in a regular bow and then passed down through the other apertures 26 and 28, and further through apertures 30 and 32 if desired. The retainer is effective not only in maintaining the knot but in addition it shortens the tag ends of the shoelace so that they will be in an out of the way position. The ends 16a and 16b after having been inserted upwardly through the apertures 30 and 32 can be tied in another knot if desired to more positively secure the lace and also to shorten it more if necessary.

It is to be understood that the form of my invention herein shown and described is to be taken as a preferred example of the same and that various changes in the shape, size and arrangement of parts may be resorted to without departing from the spirit of my invention, or the scope of the subjoined claims. For example, the body member 20 may take various shapes as desired.

Having thus described my invention, I claim:

1. A knot retainer for shoelaces comprising
   (a) a disc-like body member having upper and lower surfaces and also having outer defining edges,
   (b) said body member being arranged to lie flat on the lacing area of a shoe,
   (c) first aperture means extending through said body member within the outer defining edges thereof arranged to receive upwardly therethrough both the free ends of a shoelace to be tied, (d) said body member being arranged to support a bow knot in the shoelaces on the upper surface thereof in the area of said first aperture means, (e) and a pair of second apertures extending through said body member within the outer defining edges thereof on opposite sides of said first aperture means and arranged to receive downwardly therethrough the respective free ends of the shoelace after a knot has been tied on the upper surface of said body member.

2. The knot retainer of claim 1 including third aperture means extending through said body member within the outer defining edges thereof and arranged to receive upwardly therethrough the free ends of the shoelaces after they have been passed down through said second aperture means.

3. The knot retainer of claim 2 wherein said third aperture means includes a pair of apertures arranged to receive respective ends of the shoelace.

* * * * *